United States Patent [19]

Jabsen

[11] 3,828,868

[45] Aug. 13, 1974

[54] FUEL ASSEMBLY FOR A NUCLEAR REACTOR

[75] Inventor: Felix S. Jabsen, Lynchburg, Va.

[73] Assignee: The Babcock & Wilcox Company, New York, N.Y.

[22] Filed: Jan. 12, 1973

[21] Appl. No.: 323,015

Related U.S. Application Data

[63] Continuation of Ser. No. 880,267, Nov. 26, 1969, abandoned.

[52] U.S. Cl. .................................. 176/78, 176/76
[51] Int. Cl. .......................... G21c 3/14, G21c 7/12
[58] Field of Search ............. 176/76, 78, 79, 81, 86, 176/87

[56] References Cited
UNITED STATES PATENTS

| | | | |
|---|---|---|---|
| 3,015,616 | 1/1962 | Sturtz et al. ........................ | 176/78 |
| 3,255,091 | 6/1966 | Frisch ................................ | 176/78 |
| 3,314,859 | 4/1967 | Anthony ............................. | 176/50 |
| 3,375,172 | 3/1968 | Mansson et al. ................... | 176/78 |
| 3,423,287 | 1/1969 | Anthony et al. ................... | 176/76 X |
| 3,481,832 | 12/1969 | Rickert ............................... | 176/86 X |

FOREIGN PATENTS OR APPLICATIONS 1,101,354  1/1968  Great Britain ........................ 176/76

*Primary Examiner*—Carl D. Quarforth
*Assistant Examiner*—Roger S. Gaither
*Attorney, Agent, or Firm*—J. M. Maguire, Esq.; J. P. Sinnott, Esq

[57] ABSTRACT

A nuclear reactor fuel assembly in which both fuel rods and control rod guide tubes are held in a predetermined parallel spacing relation by a pair of spaced end grids. The guide tubes are secured to the end grids by releaseable connection means that allow the tubes to be installed and individually replaced with the fuel rods already installed in the assembly.

2 Claims, 5 Drawing Figures

PATENTED AUG 13 1974
3,828,868
SHEET 1 OF 2
FIG. 1
FIG. 2
FIG. 3
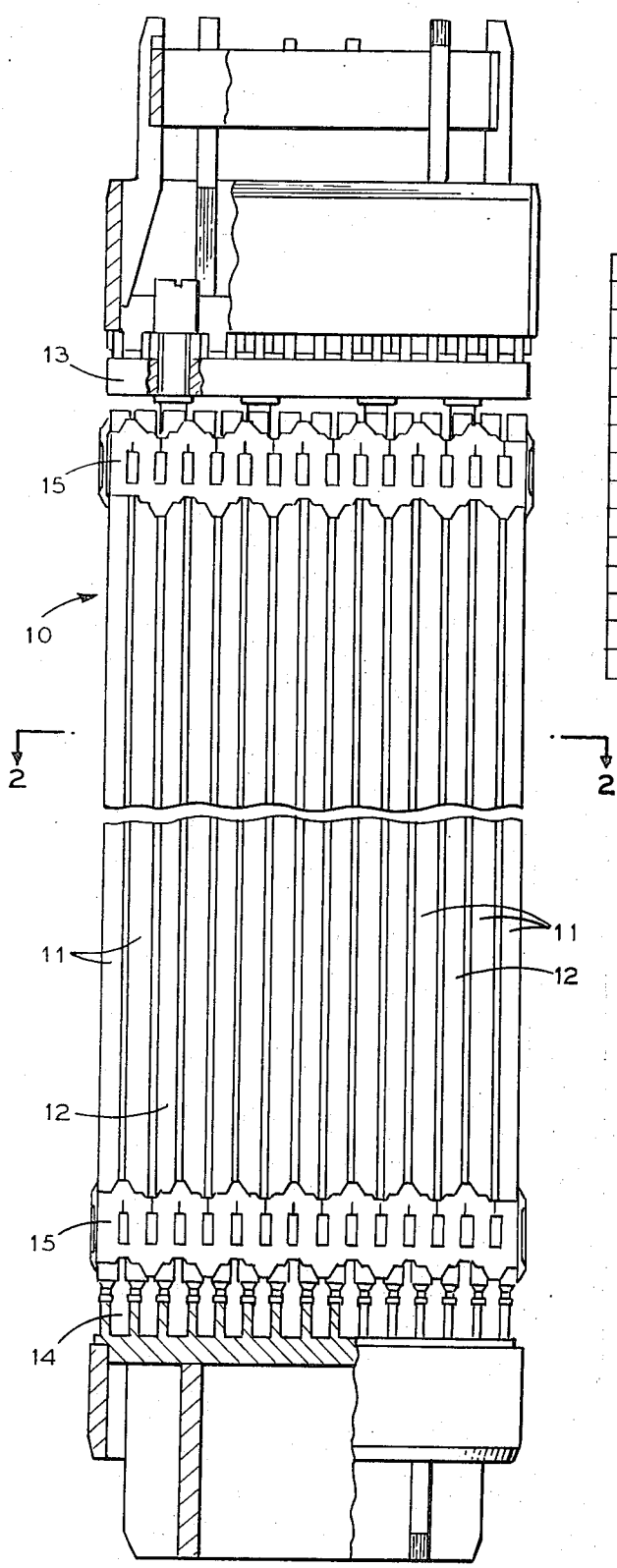
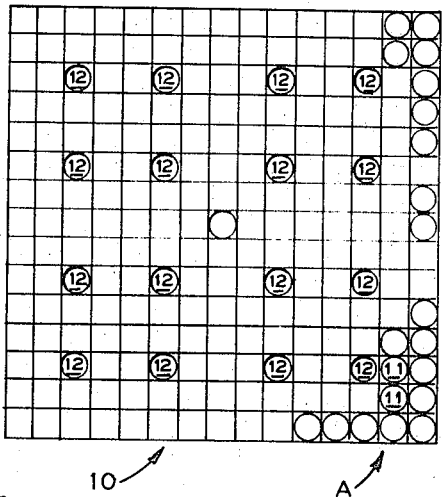
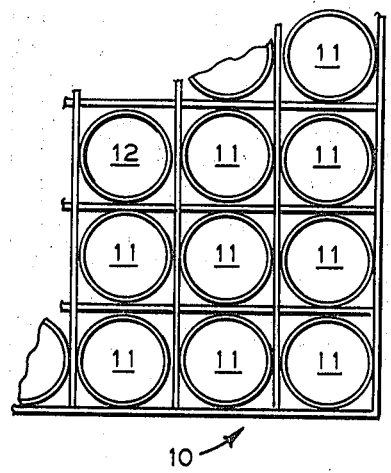
INVENTOR.
Felix S. Jabsen
BY
ATTORNEY

FUEL ASSEMBLY FOR A NUCLEAR REACTOR

This is a continuation of Ser. No. 880,267, filed Nov. 26, 1969, now abandoned.

BACKGROUND AND SUMMARY OF THE INVENTION

This invention relates in general to the construction of nuclear reactors, and more particularly to the construction of a fuel assembly as used in the core of a nuclear reactor.

In certain fuel assemblies of the prior art, there are provided, along with the fuel pins, guide tubes that were used as pathways for the insertion and withdrawal of the control rods or pins. Heretofore, the guide tubes have been permanently fastened to the end grid structures of the fuel assembly such their replacement, when necessitated by tube wear, was so difficult that even the fittings used in connecting the tubes to the grid structures were frequently rendered unuseable when the tubes were removed.

The invention provides an improved fuel assembly wherein the guide tubes are releaseably connected to the end grid structures such that they can be easily installed without disturbing the fuel rods already installed in the assembly.

In the improved fuel assembly of the invention, there are a plurality of fuel rods and at least one control rod guide tube all held in predetermined parallel spaced-apart relation to one another by a pair of end grid structures with the ends of each guide tube secured to the respective grid structures by releaseable connections. The connection means at one tube end has a threaded sleeve part weld-connected to the tube and received in a passage extending through a corresponding grid structure. The connection means for the other tube end has a threaded shank part weld-connected to the tube and received in a passage extending through the other grid structure, which passage is coaxially aligned with the grid structure passage that receives the sleeve part.

The diameter of at least one of these grid structure passages is of sufficient size to allow the lengthwise movement therethrough of the guide tube along with the sleeve and shank parts utilized in making the releaseable connections of the guide tube to the grid structures, thus the assembly and welding of these parts to the tube itself can be performed before installation of the tube in the fuel assembly. Consequently, there is no need to perform any welding operations in the crowded environs of the fuel assembly.

The guide tube is locked in a fixed position with respect to the grid structures by nuts that are screwed onto the threads of the sleeve and shank parts.

To provide axial adjustment of the guide tube relative to the grid structure connected to the shank end of the tube, the passage through that grid structure is larger in diameter than the shank and has a threaded portion. A threaded bushing slipped over the shank is screwed into the passage threads to provide an adjustable stop for the shank nut.

A similar axial adjustment feature can be optionally provided in the other guide tube end, in which case the associated grid tube passage is larger in diameter than the sleeve part, and is threaded. A threaded bushing slipped over the sleeve is screwed into the passage to act in concert with a shoulder on the sleeve to provide an adjustable stop.

For greater reliability the sleeve and shank nuts are secured by tack welds which can be easily removed by chipping or grinding any time it is desired to release the connections of the tube to the grid structures.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the drawing:

FIG. 1 is a side view, partly in section, of a fuel assembly constructed in accordance with a preferred embodiment of the invention.

FIG. 2 is a transverse sectional view of the fuel assembly shown in FIG. 1 as taken along line 2—2 therein.

FIG. 3 is an enlargement of the corner portion A of FIG. 2.

DESCRIPTION OF THE PREFERRED EMBODIMENTS OF THE INVENTION

Figure 4:
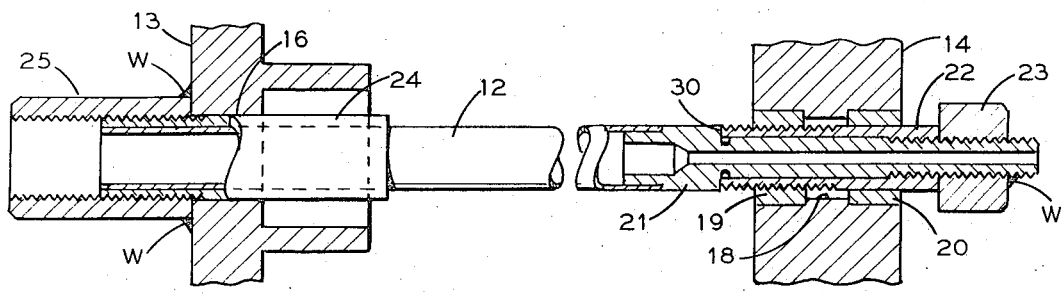
FIG. 4 is a detail view showing the installation of a typical control rod guide tube in the fuel assembly of FIG. 1.

FIGS. 1, 2 and 3 illustrate generally the type of nuclear fuel assembly 10 in which the improved control rod guide tube installation of the invention can be used to advantage.

In the fuel assembly 10, there is a plurality of elongated fuel rods 11 and guide tubes 12 maintained in a predetermined parallel, spaced-apart relation to one another by a pair of end grid structures 13 and 14. For stabilizing the rods 11 and tubes 12, intermediate grid structures 15 are expediently used. The tubes 12 serve to receive respective fuel rods (not shown) that are operative during reactor operation to regulate the level of reactivity of the multiple fuel assembly units 10 which constitute the core.

To accommodate installation of the guide tubes 12, for each tube 12 there is provided a pair of coaxially aligned passages, each passage extending through corresponding grid 13, 14. These passages can be defined by a variety of means, as better seen from FIGS. 4 and 5.

Figure 5:
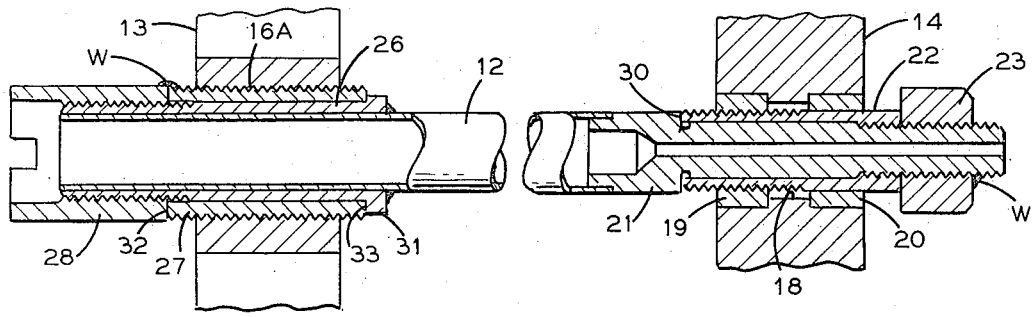
FIG. 5 is a detail view similar to that of FIG. 4 but showing a modified guide tube installation arrangement.

In the embodiment of the invention represented by FIG. 4, for grid 13 the typical tube passage 16 is a smooth bored hole, whereas in the embodiment of FIG. 5 the typical grid 13 passage 16A is internally threaded.

In both FIGS. 4 and 5, the typical tube passage in grid 14 is defined by the combination of an open portion 18 of grid 14 itself, an internally threaded ring 19 affixed to grid 14, and a smooth bore ring 20 also affixed to grid 14, the rings 19 and 20 being coaxially aligned.

Releaseable connection of the tube 12 to grid 14 is effected by means comprising a threaded shank 21 welded to the associated end of tube 12, a threaded bushing 22 and a nut 23.

In the case of the FIG. 4 embodiment, releaseable connection of tube 12 to grid 13 is effected by means comprising a threaded sleeve 24 welded to the associated end of tube 12 and a nut 25.

For the FIG. 5 embodiment, releaseable connection of tube 12 to grid 13 is effected by the combination of a threaded sleeve 26 welded to the end of tube 12, a threaded bushing 27, and a nut 28.

In the practice of the invention, the sleeve parts 24, 26 and shank parts 21 are welded to tubes 12 before installation thereof into fuel assembly 10. Accordingly, the passage through at least one of the grids 13, 14 is of sufficient size to allow the lengthwise movement therethrough of the guide tube 12 together with the shank 21 and such sleeve 24, 26 as welded to tube 12.

For example, in the case of the FIG. 4 embodiment, the subassembly consisting of the tube 12, with shank 21 and sleeve 24 both welded in place, is slipped lengthwise through passage 16 in grid 13 until shank 21 is received through the ring 19 and ring 20 in grid 14, and sleeve 24 is received through passage 16. The outside diameter of sleeve 24 is approximately equal to the inside diameter of passage 16 and is equal to or greater than the outside diameter of that portion of shank 21 passing through grid 14. Bushing 22 is slipped over shank 21 and screwed through ring 19 until it bears against shoulder 30 on shank 21. The axial position of tube 12 relative to grid 14 can be selectively adjusted within the threaded length limits of bushing 22 simply by turning same in threaded ring 19. When the desired position has been attained, nut 23 is tightened until stopped by the bushing 22, thereby locking tube 12 in position. Connection of tube 12 to grid 13 is completed by tightening nut 25 until it bears against grid 13. Thus connections to both grids are releaseable and the connection to grid 14 is also adjustable to permit longitudinal adjustment of tube 12 between grids 13 and 14.

Installation of the preassembled tube 12, with welded sleeve 26 and shank 21 combination in the FIG. 5 arrangement is accomplished in a similar manner to that described in relation to FIG. 4 insofaras connection of tube 12 to grid 14 is concerned. The difference between the FIG. 4 and FIG. 5 arrangement lies in the feature that in FIG. 5 there are adjustable connections to both grids 13 and 14. For providing adjustable connection to grid 13, the inside diameter of threaded passage 16A is made somewhat larger than the shoulder 31 outside diameter of sleeve 26. This allows the use of adjustment bushing 27 which serves to set the axial position of tube 12 relative to grid 13. Accordingly, after completing the connection to tube 12 to grid 14, bushing 27 is slipped over sleeve 26 and screwed through passage 16A, and nut 28 is tightened until it bears against the outside end 32 of bushing 27 and draws shoulder 31 to bear against the inside end 33 of bushing 27 to establish the axial location of tube 12 with respect to grid 13.

Tack welds W are preferably provided to secure the extremital nuts 23, 25 and 28 in place, and should it be desired to replace a particular tube 12 such tack welds W are easily removed by grinding or chipping to facilitate release of the connections between grids 13 and 14 and the tube 12.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a fuel assembly for a nuclear reactor having a plurality of fuel rods and at least one control rod guide tube having a first and a second end held in parallel spaced apart relation by a first and a second grid, the improvement comprising the separable engagement of said guide tubes from each of said grids for removal of said guide tubes without altering the posture, position or attitude of said fuel rods in said grids, a threaded sleeve integral with the first guide tube end, first securing means for separable engagement with said threaded sleeve after passage of the first guide tube end through said first grid which it engages, a shank integrally provided on the second end of the guide tube, a bushing having an interior for mating engagement with said shank, at least one spacer ring positioned within said grid, said ring having an interior surface for separable engagement with the outer surface of said bushing, a shoulder formed on said shank to limit the movement of said bushing on said shank and, second securing means on the extremital end of said shank facilitate release of the connections between said first and second grids for removal of the guide tube therefrom.

2. The fuel assembly of claim 1 further comprising another bushing having an inner surface for engaging the first grid, a shoulder stop formed on said sleeve in order to engage said another bushing and directly limit the mating movement of said first securing means on said sleeve.

* * * * *

UNITED STATES PATENT OFFICE
CERTIFICATE OF CORRECTION

Patent No.: 3,828,868          Dated: August 13, 1974

Inventor(s): Felix S. Jabsen

It is certified that error appears in the above-identified patent and that said Letters Patent are hereby corrected as shown below:

Claim 1, line 6, cancel "tubes" and substitute --tube--;

line 7, cancel "tubes" and substitute --tube--;

line 18, after "said" insert --second--;

line 24, after "shank" insert --to--.

Signed and sealed this 21st day of January 1975.

(SEAL)
Attest:

McCOY M. GIBSON JR.
Attesting Officer

C. MARSHALL DANN
Commissioner of Patents